Aug. 8, 1967  J. W. SKOOGLUND ETAL  3,335,367
CURRENT RESPONSIVE LIGHT VARYING MEANS AND LIGHT
SENSITIVE MEANS RESPONSIVE TO THE VARIATIONS
Filed May 3, 1963 2 Sheets-Sheet 1

INVENTORS
John W. Skooglund
and Wilbert H. Ferguson, Jr.
BY
ATTORNEY

United States Patent Office 3,335,367
Patented Aug. 8, 1967

3,335,367
CURRENT RESPONSIVE LIGHT VARYING MEANS AND LIGHT SENSITIVE MEANS RESPONSIVE TO THE VARIATIONS
John W. Skooglund, North Huntingdon Township, Westmoreland County, and Wilbert H. Ferguson, Jr., Franklin Township, Westmoreland County, Pa., assignors to Westinghouse Electric Corporation, Pittsburgh, Pa., a corporation of Pennsylvania
Filed May 3, 1963, Ser. No. 277,947
7 Claims. (Cl. 324—96)

This invention relates to improvements in current responsive and current measuring devices for use with high voltage transmission lines, circuit breakers, transformers having "hot" cases, and other high voltage equipment, and more particularly to improved current responsive and current measuring apparatus utilizing optical fiber transmission from the circuit point or equipment at high potential to a remote point to provide at the remote point a signal which varies in instantaneous amplitude in accordance with variations in the instantaneous current in the circuit of high potential.

As will be readily understood, when it is desired to measure the current in a high voltage circuit, or have a relay responsive to current variations, the use of a separate current transformer, insulated for full circuit or line-to-ground voltage, to provide a signal which is proportional to the current in the circuit, becomes prohibitive in cost at very high voltages, where the size and insulation required would render the current transformer very expensive. In order to eliminate the necessity for a current transfomer insulated for full line-to-ground voltage, several prior art schemes have been advanced for obtaining a signal at a remote point which is a measure of the current in the circuit, but generally speaking these devices or schemes have been characterized by inefficiency and instability especially over a period of time.

Our invention relates to means for transmitting a signal from a circuit point which is at a high potential difference with respect to ground by utilizing an optical system. Our invention employs a bundle of optical fibers of glass or other suitable material for the transmission means rather than air. This eliminates the necessity for a costly lens arrangement, and permits much improved definition especially at the longer transmission distances of the order of 10 to 15 feet and above.

In summary, our invention in one embodiment thereof includes but is not limited to a series resistor in, or a bushing type current transformer on, a high voltage circuit conductor for obtaining a voltage which is applied to a galvanometer, where it may be utilized to deflect a mirror in an amount proportional to the amplitude of the current. Where an alternating current is to be measured, the mirror is a pivotally mounted galvanometer reflecting element or mirror, so that the galvanometer mirror periodically swings about the pivot axis and follows the cyclic variations in the line current. The mirror may instead have reciprocative motion, if desired. Disposed at a remote point and at ground potential is a source of illumination, the light from which is transmitted to the region of the galvanometer through a group of optical fibers and focused by a lens as a narrow beam impinging upon the mirror. Terminating at or near the galvanometer is another larger group of optical fibers, disposed in a rectangular pattern with their ends preferably lying on the arc of a circle having its center at the pivot point, and being arranged so that as the current in the line varies cyclically from a peak value of one polarity to a peak value of the other polarity, the reflected beam from the galvanometer mirror sweeps over a number of the fiber ends of the larger group of fibers, the number swept varying with variations in the amplitude of the current. This larger group of optical fibers, upon the ends of which the reflected light beam impinges, extends through suitable housing or mounting means to detector apparatus located at ground potential, where the fibers, or bunches of the fibers, have photoelectric devices, which may be photoconductive devices, operatively associated therewith, each photoelectric device being turned on momentarily by light transmitted down a fiber or fiber bunch as the beam from the galvanometer mirror sweeps across the ends of the fibers which terminate near the galvanometer. When the photocells are rendered sequentially conductive by the light beams, they effectively control connections to a voltage dividing resistance network whereby voltages of different amplitudes are sequentially switched into an amplifier input circuit, variably in accordance with the movement of the reflected beam of light from the galvanometer mirror, and accordingly a cyclically varying step voltage is produced at the input of the amplifier in accordance with the progressive illumination of the various photocells. This cyclic step voltage is smoothed in the amplifier and the waveform of the current in the line substantially restored; the output of the amplifier is utilized in any manner similar to that of a current transformer to operate an indicator, relay, or other control device. An indicator, if used may be calibrated in current values for current in the high potential circuit.

Accordingly, a primary object of the invention is to provide new and improved current responsive apparatus for use with a high voltage circuit.

Another object is to provide new and improved high voltage current responsive or current measuring apparatus utilizing optical fibers to transmit an optical signal from a circuit point to detector apparatus located at ground potential.

A further object is to provide new and improved photoelectric apparatus responsive to an optical signal for providing an indication of variations in the signal.

These and other objects will become more clearly apparent after a study of the following specification, when read in connection with the accompanying drawings, in which:

FIG. 6 shows a galvanometer connected for measuring a direct current according to a third embodiment of our invention.

Figure 1:
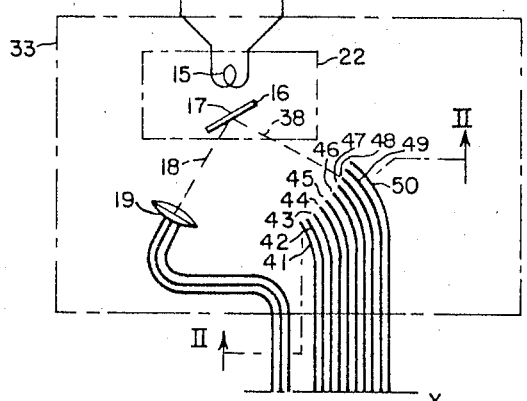
FIGURE 1 is a view, partially schematic and partially diagrammatic, of the electrical and optical apparatus utilized in practicing our invention according to the preferred embodiment thereof.

Referring now to the drawings, in which like reference numerals are used throughout to designate like parts, for a more detailed understanding of our invention and in particular to FIG. 1 thereof, there is shown at 10 the conductor of high voltage transmission line, or the conductor of any high voltage circuit, having the bushing type current transformer 11 mounted thereon, the output leads 12 and 13 of which are connected to a resistor 14 across which is connected the deflecting coil 15 of a galvanometer generally designated 22 having the movable mirror 16 mounted in any convenient manner, not shown, and having sufficient flexibility and low time constant so that the mirror can follow the current alternations, harmonics, and high frequency transients. Mirror 16 is shown as pivotally mounted at 17, but it should be understood that mirror 16 could have reciprocative motion, if desired. Even though the line is a 60-cycle line, harmonics and transients up to, for example, 2000 c.p.s. may be components of the waveform. Galvanometers are readily available commercially will follow 2000 c.p.s. While the pivot point or axis for the mirror 16 is indicated at 17 and will be useful in describing the operation of the apparatus, it should be understood that the mirror 16 can be pivoted for rocking movement about an axis, in any convenient manner.

A narrow beam of light indicated at 18 is focused upon the mirror 16 by the lens 19. This light originates at a suitable source, which may be located at a point of ground potential, and is transmitted to the lens 19 through a plurality of optical fibers 20 disposed in one end of a rectangular housing 21, FIG. 2, composed of insulating and weather resisting material such as porcelain.

Figure 2:
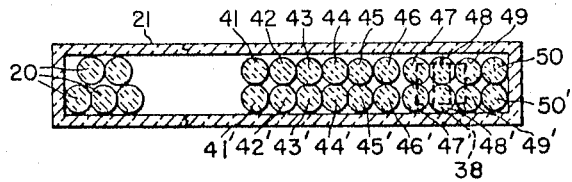
FIG. 2 is a cross-sectional view of one possible arrangement of optical fiber bundles for transmitting light to and from the galvanometer mirror located at the high voltage conductor.

It will be understood that the number of fibers shown in FIG. 2, that is 5, is chosen for simplicity of illustration only, and that any desired number of optical fibers may be employed for bringing light from the lamp source 24, FIG. 1, which is connected by leads 25 and 26 to a source of energizing potential 27. The lamp 24 may be any convenient type having a source of light which can be readily focused by lens system 28. Disposed near the lamp 24 is the aforementioned lens or lens system 28 for focusing light into the ends of the fibers 20 adjacent thereto. It will be understood that the full voltage-to-ground of the high voltage conductor 10 is applied substantialy across the optical fiber arrangement, and accordingly, in order to protect a user of the apparatus, a band of metal or other suitable conductive material is disposed around the fibers closely adjacent thereto, this band being designated 30 and being grounded at 31. It will be understood that the fibers may extend any convenient length, for example, 20 or 25 feet, and accordingly the fibers conducting light both to and from the galvanometer are shown broken at lines X in FIG. 1, to indicate the additional length thereof.

As previously stated a thin light beam of high intensity 18 is focused on the mirror 16 which is pivoted for rotary movement about its axis and as the mirror 16 rotates a reflected beam 38 sweeps over the ends of a plurality of optical fibers or a plurality of groups of optical fibers disposed in a longitudinal pattern, with the ends preferably lying on an arc so that they are substantially equi-distant from the mirror. In FIG. 1, for simplicity of illustration, 10 fibers 41 through 50 are shown, and it should be understood that any number of fibers or groups of fibers may be disposed in a parallel line, the number of fibers being related to the required accuracy of the device. In FIG. 2 these fibers 41 to 50 inclusive are shown having side-by-side aligned fibers 41' to 50', it being understood that the width of the beam is such that the beam sweeps over the pairs of aligned fibers and that thereby a greater intensity of illumination is provided at the photocells located at the detector position. Whereas two fibers are shown in FIG. 2 for each photocell, and for simplicity of illustration one fiber is shown in FIG. 1 for each photocell, it will be understood that many fibers may be employed for each photocell; whereas ten photocells are shown in FIG. 1 for convenience of illustration, a much larger number might be provided, for example, fifty or even one-hundred, where accuracy requirements make this desirable.

Photoelectric devices 51–60 may be photoconductive cells, each having a resistance which is an inverse function of the intensity of illumination on the cell.

It will be seen that, in accordance with the setting of the mirror 16 of FIG. 1, the beam 38 strikes the optical fiber 48, and in FIG. 2, to which particular attention is directed, the central and most intense portion of the beam 38 is shown impinging on both of the optical fibers 48 and 48', the beam having a sufficiently great width to illuminate both aligned fibers. Adjacent pairs of fibers, pair 47 and 47' on one side of the directly illuminated pair, and pair 49 and 49' on the other side thereof, receive some illumination, but not as much as fibers 48 and 48'.

In FIG. 1, the fiber 41 to 50 inclusive are seen extending downward through the housing 21, past the ground strip 30, and each of the fibers is terminated at a photoconductive device, for illuminating the particular associated photoconductive device at substantially the instant that the beam 38 sweeps over that particular fiber, the photoconductive devices being designated 51 to 60 for the fibers 41–50 respectively.

In FIG. 1 a direct current source 94 has one terminal thereof, which may be the negative terminal, connected to resistor 92, lead 71, resistor 81, lead 72, resistor 82, lead 73, resistor 83, lead 74, resistor 84, lead 75, center tapped resistor 85, lead 76, resistor 86, lead 77, resistor 87, lead 78, resistor 88, lead 79, resistor 89, lead 80, resistor 90, and thence by way of lead 91 to the other or positive terminal of the direct current source 94. Connected to the center tap 95 of resistor 85 is one input lead 96 of an amplifier having a resistive input impedance 93 and shown in block form at 97. If the circuit conductor 10 carries an alternating current, amplifier 97 should be an alternating current amplifier. The other input lead 98 to the amplifier 97 is connected to one output terminal of each of the ten photoconductive devices 51 to 60 inclusive. The other output terminal of photocell 51 is connected to lead 71; the other terminal of photoconductive device 52 is connected to lead 72; the other terminal of photocell device 53 is connected to lead 73; the other terminal of photoconductive device 54 is connected to lead 74; the other terminal of photocell device 55 is connected to lead 75; the other terminal of photocell device 56 is connected to lead 76; the other terminal of photocell 57 is connected to lead 77; the other terminal of cell 58 is connected to lead 78; the other terminal of cell 59 is connected to lead 79; and the other terminal of photocell 60 is connected to lead 80.

The output of the amplifier 97 is supplied by leads 99 and 100 to a suitable utilization circuit 101 which may include a meter calibrated in current values of the current in conductor 10.

As will be more fully apparent hereinafter from a discussion of FIGS. 3 and 4, where conductor 10 carries an alternating current, the input to the amplifier 97 is not a true alternating current waveform, but rather consists of a series of more or less discrete steps as the light beam 38 swings over the fibers 41 to 50 inclusive successively illuminating all or part of the photocells 51 to 60 inclusive. At zero phase in the current in coil 15 the center of light beam 38 may fall at a point between optical fibers 45 and 46, illuminating both fibers to some extent, and this position may be arbitrarily thought of as corresponding substantially to the zero axis of the alternating current cycle. Neglecting harmonic and transient waveform distortions, the maximum illumination of fiber 41 would correspond to the peak amplitude of one alternation where the conductor was carrying maximum current, for example, the negative alternation, whereas the maximum illumination of fiber 50 would correspond to the peak possible amplitude of the positive alternation at the same conductor current.

It will be understood that photocells 51–60 are not necessarily "on-off" devices, in which the impedance has a substantially infinite value when there is no cell illumination, and falls to substantially zero when the illumination reaches a certain intensity, but that all of the cells may conduct all of the time, the resulting voltage across impedance 93 according to Kirchhoff's law varying in effective polarity and amplitude in accordance with which cell or cells are most intensely illuminated. The alternating current amplifier 97 includes conventional circuits which may restore the waveform so that a substantially sine wave is provided on leads 99 and 100 when the waveform in conductor 10 is sinusoidal. This circuitry may include filters and other similar devices.

Figure 4:
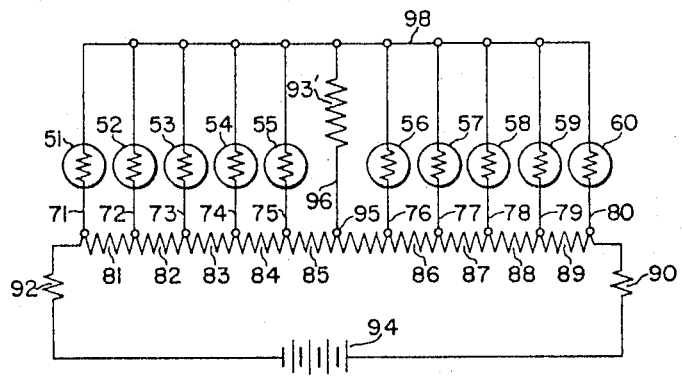
FIG. 4 is an electrical circuit equivalent diagram which further illustrates the operation of our invention of FIG. 1.

Particular reference is made now to FIG. 4, in which an equivalent circuit of the photocells and resistance dividing network of FIG. 1 is seen. For convenience of illustration let it be supposed in FIG. 4 that resistors 81 to 84 inclusive have the same value, resistors 86 to 89 inclusive have the same value which is also equal to the value of resistors 81 to 84, and that resistor 85 has twice the value of resistors 81 to 84 inclusive and twice the value of resistors 86 to 89 inclusive. Resistors 90 and 92 are equal in value but somewhat smaller in value than resistors 81–89. It will be seen then that, assuming the source of potential 94 has a potential of 100 volts, and neglecting the small resistors 90 and 92, the potential between successive leads 71, 72, 73, 74 and 75 is ten volts, that a potential of twenty volts exists between leads 75 and 76, and that a potential of ten volts exists between successive leads of the group 76, 77, 78, 79 and 80. The center tap 95, to which resistor 93′ corresponding to the input impedance 93 of amplifier 97 is connected by lead 96, is then at a potential difference of substantially 50 volts with respect to each of end leads 71 and 80. The upper end of resistor 93′ is connected to lead 98, as is one terminal of each of the photocells 51–60. Assume now by way of example that photocell 58 is most illuminated by light conducted thereto through fiber 48 of the optical fiber arrangement. Neglecting the internal drop in the photocell 58, in effect this connects the lead 98 of the resistor 93′ to a point which is at plus thirty volts with respect to lead 96 and the other end of resistor 93′. Voltages introduced into the circuit by cells illuminated to lesser degrees are also neglected. Assume now that the beam swings until photocell 53 is illuminated; the lead 98 and upper end of resistor 93′ are in effect connected to lead 73 which is at a potential of minus thirty volts with respect to lead 96. The photocells, then, in effect switch the impedance 93′ across different potential points of the resistance network as the photocells are successively illuminated by the beam of light 38, the light being transmitted through the optical fibers.

Figure 3:
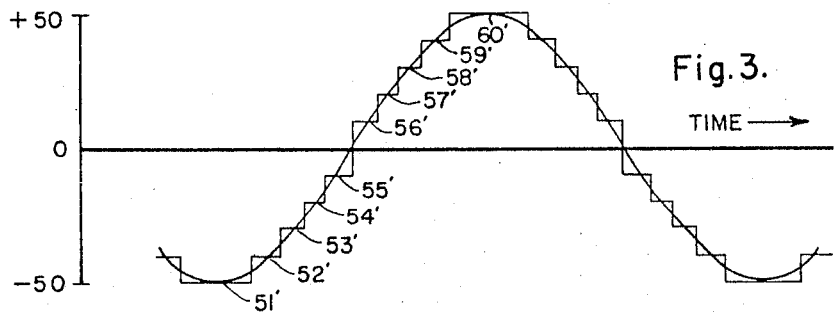
FIG. 3 is a graph illustrating the operation of the apparatus of our invention of FIG. 1.

Particular reference is made now to FIG. 3. It will be understood that the curve of FIG. 3 is highly simplified and idealized in a number of respects, one being that the wave form in conductor 10 is not necessarily sinusoidal; also the steps are not sharply defined sudden variations in voltage, but represent averages. Furthermore, the time intervals at which the various cells 51–60 are shown as being energized as the beam sweeps from fiber 41 to fiber 50 and back again are shown as being somewhat similar, whereas it will be understood that if the mirror 16 follows a sine wave pattern of the alternations as it is expected and desired to do if the current in conductor 10 is actually a sine wave, that the beam of light may pass more rapidly over some fibers than it will others, and that the widths of the steps shown in FIG. 3 will vary. The zero axis in FIG. 3 represents the amplitude when the center of the beam 38 of FIG. 1 is disposed between the ends of fibers 45 and 46, and cells 55 and 56 are illuminated in substantially equal amounts, but the currents therethrough produce potentials of opposite polarity across impedance 93′ so that the voltages cancel. Assume now that the movement of the beam 38 results in the illumination of photocell 55 to the greatest degree of any of the cells, then the upper end of the input impedance 93′ becomes a potential of minus ten volts with respect to the lower end thereof, indicated by step 55′, neglecting the impedance of the voltage drop across cell 55. On the other hand, if photocell 56 is illuminated as a result of movement of the beam 38, the upper end of impedance 93′ becomes substantially plus ten volts with respect to the lower end thereof, indicated by the step designated 56′, neglecting the impedance of and voltage drop across cell 56. The substantially sine wave curve $y$ indicates the wave form after restoration by the circuits of amplifier 97.

It will be understood that the voltage between the photocells of FIG. 4 may be any desired value, for example, if the voltage between pairs of leads 71 to 75 were made eleven volts, then a voltage of 12 volts could be made to exist between leads 75 and 76, and a voltage of eleven volts between leads 76, 77, 78, and 79 and 80. If desired, the voltage drops between all of the leads 71, 72, 73, 74, 75, 96, 76, 77, 78, 79 and 80 could be equal, the value of resistor 85 being made the same as the value of the other resistors in the network. It will be also understood that a larger number of photocells could be employed, with a correspondingly larger number of optical fibers extending between the galvanometer and the photocells, so that the voltage between adjacent leads of a pair could be one volt, or even a fraction of a volt.

It will further be apparent that lead 96 of the impedance 93 or 93′ need not be connected to a center point on the voltage divider, but that it might be connected to one terminal of the source 94, in which case the axis of the curve of FIG. 3 would be shifted to either the upper or lower extremity; there would be no change of polarity across the input impedance 93 or 93′, but the output of the amplifier 97 could still resemble an alternating current, and a suitable zero axis be supplied by the circuitry of the amplifier.

Figure 5:
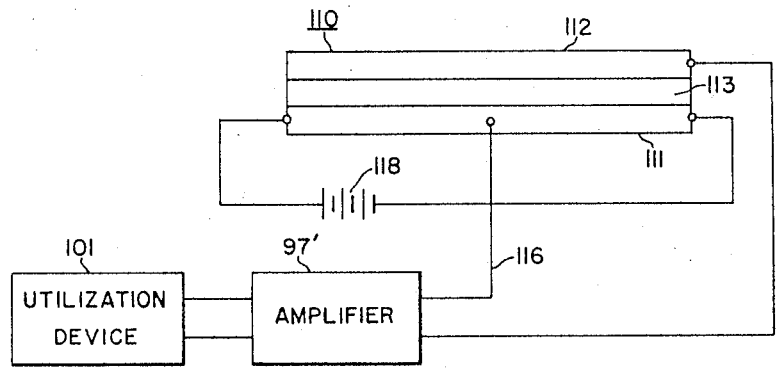
FIG. 5 is a view of our invention according to a second embodiment thereof.

Particular reference is made now to FIG. 5, in which a second embodiment of the invention is shown. In FIG. 5 a block, which may be a semiconductor block having suitable areas of doping with selected impurities in predetermined concentrations, is generally designated 110. This block includes a resisitive coating layer, or region 111, a conductive coating, layer or region 112, and disposed therebetween a photoconductive layer or strip 113. It will be understood that the light beam as transmitted by the fibers sweeps up and down the surface of the photoconductive layer 113. The resistive coating 111 may have uniform distributed resistance along the length thereof, and the two ends thereof are connected to a source of direct current energizing potential 118; a center tap of the resistive layer 111 is connected to one input terminal of the amplifier 97′. The other input terminal of amplifier 97′ is connected to the conductive coating or layer 112. As the light beam sweeps along the surface of the photoconductive layer 113 a moving path between conductive coating 112 and the resisitive coating 111 is established from successive points on resistive coating 111 which are at different potentials with respect to the conductive coating 112, and accordingly the input to the amplifier 97′ varies in amplitude in accordance with variations in the instant position of the light beam on photoconductive layer 113. Amplifier 97′ supplies its output to an indicator or utilization device 101.

For a fuller explanation of the manner in which light may be transmitted by optical fibers from point-to-point, reference may be had to an article entitled, "Fiber Optics for Electronics Engineers," by George V. Novotny, appearing in Electronics, June 1, 1962, pp. 37–41. Other articles and works may be found in the literature of the art.

Particular reference is made now to FIG. 6, in which an embodiment of the invention is shown for use in measuring a direct current. Direct current line 120 has a small resistor 121 connected in series therein for obtaining a voltage proportional to the current in the line. Leads 122 and 123 apply this voltage to a direct current galvanometer 124 which may be of the conventional type in which the mirror rotates to a variable position variably in accordance with the amplitude of the direct current signal, and returns to a normal position when the direct current signal falls to zero.

Where direct current in line 120 will always flow in the same direction, galvanometer 124 may be so arranged with respect to optical fibers 41–50 that when there is no current in line 120, the center of beam 38′ falls to the left of fiber 41, as seen in FIG. 1, illuminating fiber 41 only slightly. The remainder of the detector circuit may be similar to that shown in FIG. 1, except that lead 96 is disconnected from point 95 and is connected to lead 71 or lead 91. Amplifier 97 should accept a direct current input, which may be chopped or otherwise interrupted to provide an alternating current for further amplification, or the direct current input could be amplified to control a direct current utilization device.

If desired, an additional fiber and an additional cell could be added to the arrangement, which would be illuminated at zero current.

Where it is contemplated that the direct current in conductor 120 may flow in either direction, the galvanometer may be so arranged that at zero current beam 38′ falls between fibers 45 and 46. Lead 96 may be left connected to the center tap. The amplifier should take direct current inputs of either polarity.

There has been provided, then, apparatus well suited to accomplish the objectives of the invention.

The source of illumination 24, and the photocells and utilization and indicating circuits, are all at ground potential and separated from the high potential conductor 10 by as much distance as may be required. It will be understood that the optical fibers, which may be glass or other suitable material, for example, certain plastics, are non-conductive and insulate the detecting and indicating circuit from the line. The fibers in FIG. 2 may be staggered, if desired.

Any suitable means, not shown, may be utilized for mounting the galvanometer and fiber assembly 33 on the current transformer and high voltage conductor. Cladding, not shown in FIG. 2, may be used if desired to optically insulate the fibers from each other. Extramural cladding may also be employed, if desired.

Whereas photocells 51–60 are shown aligned, it will be understood that the cells may be bunched in any convenient manner so long as the identity between cell and optical fiber is maintained.

It will be readily understood that in the transmission column itself, FIG. 1, the pattern of the fibers may be random, as long as the pick-up end pattern is reproduced at the photocell end. The fibers are shown in FIG. 1 spaced from each other merely to assist in identifying a particular fiber at the pick-up end and at the photocell end.

Where the embodiment of FIG. 5 is to be used for measuring direct current, lead 116 instead of being connected to the center of resistive strip 111 may be connected to one terminal of battery 118; amplifier 97′ accepts a direct current input, and utilization device 101 may be a direct current operated device.

Whereas we have shown and described our invention with respect to some embodiments thereof which give satisfactory results, it should be understood that changes may be made and equivalents substituted without departing from the spirit and scope of the invention.

We claim as our invention:

1. Current responsive apparatus for an alternating current conductor comprising, in combination, a source of light, light transmitting means including optical fiber means for transmitting light from the source to a predetermined position near the alternating current conductor, movable light reflecting means coupled to the conductor and having a variable position in accordance with variations in the current in the conductor, other light transmitting means including other optical fiber means composed of a plurality of optical fibers having adjacent ends thereof disposed in aligned positions near the conductor, the movable light reflecting means coupled to the conductor directing light from the first named light transmitting means to the end of a selected one of the optical fibers of the other optical fiber means in accordance with the instant position of the movable light reflecting means, the number of optical fiber ends illuminated during any cycle of the alternating current varying with variations in the peak value of the current during said cycle, a plurality of two-terminal light sensitive devices equal in number to the optical fibers of the other optical fiber means disposed at the other ends thereof respectively, each of the light sensitive devices having the internal impedance thereof varied in accordance with variations in the intensity of light reaching the light sensitive device, a source of direct current, a plurality of series-connected resistors connected across the direct current source and forming a voltage dividing network, each of the plurality of light sensitive devices having one terminal thereof connected to a different junction between resistors in the network, all of the other terminals of the light sensitive devices being connected together, and utilization means including amplifier means having one input terminal connected to all of the other terminals of the light sensitive devices, the other input terminal of the utilization means being connected to the center point of the resistance network, periodic variations in the intensity of light reaching at least some of the light sensitive devices as the movable light reflecting means periodically varies the light intensity on the ends of at least some of the optical fibers producing an alternating current signal of variable amplitude which is applied to the utilization means, the utilization device being calibrated to give an indication of the current in the conductor.

2. Apparatus according to claim 1 in which the movable light reflecting means includes a galvanometer with a movable mirror and a deflecting coil and the coupling between the galvanometer and the conductor includes a resistor, a current transformer on the conductor having the secondary thereof connected to the terminals of the resistor, the terminals of the deflecting coil being connected across the terminals of said last-named resistor.

3. Apparatus according to claim 1 in which the source of light is additionally characterized as being at substantially ground potential, and the plurality of light sensitive devices are additionally characterized as being at substantially ground potential.

4. Current responsive apparatus for a high voltage alternating current conductor comprising, in combination, means at the conductor for obtaining a signal which varies in accordance with variations in the current of the conductor, means including a movable reflecting element operatively connected to the signal obtaining means for reflecting light in a predetermined direction in accordance with the position of the movable reflecting element, a source of light located at a point remote from the movable reflecting element, means including optical fiber means forming a light path from the source of light to the movable reflecting element, other optical fiber means including a plurality of optical fibers having the adjacent ends thereof disposed in predetermined aligned positions with respect to the movable element, the optical fibers of the other optical fiber means receiving amounts of light which vary in amplitude in accordance with the position of the movable reflecting element and accordingly in accordance with changes in current in the conductor, a plurality of photoelectric means disposed adjacent the other ends respectively of the optical fibers of the other optical fiber means, a source of direct current, a resistance network connecting the direct current source to all of the plurality of photoelectric means, amplifier means having an input connected to the resistance network and to all of the photoelectric means, a variation in the light reaching any one of the photoelectric means resulting in a variation in the amplitude of the signal input of the amplifier means, and utilization means operatively connected to the amplifier means and calibrated to indicate current values of the current in the conductor.

5. Apparatus according to claim 4 additionally characterized as producing a stepped alternating current waveform at the input to the amplifier, the voltage per step being a function of the angle through which the movable reflecting element moves in transferring light from one fiber end to an adjacent fiber end.

6. Current responsive apparatus for a high voltage alternating current line comprising, in combination, a source of light, means including optical fiber means for transmitting light from the source to the region of the line, rotatable light reflector means disposed near the line, means coupling the rotatable light reflector means to the line whereby the reflector means follows variations in the line current, means for focusing the light from the optical fiber means onto the rotatable light reflector means, other optical fiber means including a plurality of optical fibers having the adjacent ends thereof terminating in aligned spaced positions near the rotatable light reflector means whereby light swings progressively over the ends of the fibers as the rotatable reflector means rotates, light responsive means disposed at the other ends of the plurality of optical fibers for obtaining an electrical signal, the light responsive means including a block having three parallel adjacent layers, one layer on one side of the block being a resistive layer, the central layer of the block being a photoconductive layer, and the layer on the other side of the block being a conductive layer, direct current energizing means connected across the ends of the resistive layer, signal utilization means having one input terminal thereof connected substantially midway along the resistive layer, the other input terminal of the signal utilization means being connected to the conductive layer, the other ends of the optical fibers of the other optical fiber means terminating at spaced positions along the length of the photoconductive layer, a light beam sweeping along the surface of the photoconductive layer in response to light sweeping along the aligned ends of the optical fibers adjacent the rotatable light reflector means, the light beam sweeping along the surface of the photoconductive layer producing a moving path between the conductive layer and the resistive layer from successive points on the resistive layer which are at different potentials with respect to the conductive layer and producing a signal for application to the signal utilization means which varies in amplitude substantially in accordance with variations in the instant position of the light beam on the photoconductive layer, the signal corresponding in instant amplitude to the instant amplitude of the current in the alternating current line.

7. Current responsive apparatus for measuring the direct current in a high voltage line comprising, in combination, a source of light, means including optical fiber means for transmitting light from the source to the region of the line, rotatable light reflector means disposed near the line, means connected to the line for deriving a potential resulting from the voltage drop along a portion of the line, circuit means connecting the rotatable light reflector means to the means for deriving a potential whereby the rotatable light reflector means rotates to a new position when the current in the line changes, means for focusing a beam of light from the optical fiber means onto the rotatable light reflector means, other optical fiber means including a plurality of optical fibers having the ends thereof terminating in aligned spaced positions near the rotatable light reflector means whereby light moves progressively over the ends of the fibers as the rotatable reflector means rotates, light from the rotatable light reflector means illuminating at least a selected one of the optical fibers in accordance with the value of the direct current in the line, light responsive means for obtaining an electrical signal disposed at the other ends of the plurality of optical fibers, the light responsive means including a block having three parallel adjacent layers, one layer on one side of the block being a resistive layer, the central layer of the block being a photoconductive layer, the layer on the other side of the block being a conductive layer, a source of direct current potential connected across the ends of the resistive layer, and direct current responsive means having the input thereof connected between one end of the resistive layer and the conductive layer, the ends of the plurality of optical fibers of the other optical fiber means terminating at spaced positions along the length of the photoconductive layer, light from the optical fiber illuminated by the rotatable light reflector means illuminating a selected portion of the photoconductive layer and producing a conductive path between the conductive layer and the resistive layer whereby a direct current signal of predetermined amplitude is applied to the direct current responsive means in accordance with the portion of the photoconductive layer which is illuminated, the direct current responsive means being calibrated to give an indication of the current in the line.

References Cited

UNITED STATES PATENTS

| | | | |
|---|---|---|---|
| 1,514,123 | 11/1924 | Bacevicz | 250—230 |
| 2,081,839 | 5/1937 | Rankin | 324—96 |
| 2,093,215 | 9/1937 | Six | 250—230 X |
| 2,256,595 | 9/1941 | Metcalf | 250—227 |
| 2,420,159 | 5/1947 | Wineman | 324—96 X |

OTHER REFERENCES

IBM Technical Disclosure Bulletin: "Optical Displacement Measuring Device," vol. 4, No. 7, December 1961, p. 85.

WALTER L. CARLSON, *Primary Examiner.*

RUDOLPH V. ROLINEC, *Examiner.*